United States Patent Office 3,372,746
Patented Mar. 12, 1968

3,372,746
METHOD OF DETERMINING THE EXTENT OF RETURN TO THE SURFACE OF AN OIL WELL TREATMENT FLUID
Wilson I. Sanderson, Dallas, Tex., and Reginald M. Lasater, Duncan, Okla., assignors to Halliburton Company, Duncan, Okla., a corporation of Delaware
No Drawing. Filed Feb. 19, 1965, Ser. No. 434,133
9 Claims. (Cl. 166—4)

This invention relates to a method for determining the extent to which an aqueous oil well treatment fluid has been returned to the surface following injection and treatment of the well.

Many acid and other aqueous solutions are used for various purposes in the treatment of oil wells. It is frequently desirable to know when all or most of the aqueous treatment fluid has been returned to the surface. This result cannot be obtained by simply measuring the amount of fluid injected and the amount of fluid returned since the treatment fluid becomes diluted with a formation brine and other formation liquids while in the well. According to the present invention, it has been found that for aqueous treatment solutions, the addition to the treating solution of an indicator which can be readily detected in the returned liquid can be used as a measure of the amount of dilution of the original treating solution.

Accordingly, it is an object of this invention to provide a method of determining the extent to which an aqueous oil well treatment fluid has been returned to the surface.

Another object of this invention is to ascertain the extent of return of an aqueous oil well treatment fluid in a simple and economical way.

These and other objects of this invention will become apparent from the detailed description which follows.

The method of determining the extent to which an aqueous oil well treatment fluid has returned to the surface in accordance with the present invention comprises first incorporating a predetermined portion of an indicator into the aqueous oil well treatment fluid. Any of the well known indicators may be used for this purpose so long as it will show in dilute solution a detectible color in the presence of visible or invisible radiation (ultraviolet, infrared, etc.) and is non-absorbed and oil-insoluble, i.e., is neither absorbed to any substantial extent by the rock formations encountered in wells, nor dissolved by petroleum or produced solids. Included among the suitable indicators for use in this invention are those requiring titration with acid or base in order to develop the color. Typical of the suitable indicators for use in the present invention are phenolphthalein and fluorescein.

Prior to the injection of this fluid into the well it is necessary to establish the amount of indicator present in the treatment fluid to be injected. The amount of indicator incorporated in the treatment fluid is not critical and is generally dependent upon the particular indicator being used. Generally, the maximum amount of the indicator employed is limited by the solubility of the indicator in the treatment fluid and the minimum amount of indicator used is that which, upon dilution in the liquid returned to the surface, is capable of providing a detectable color in the presence of visible or invisible radiation. It has been found that certain indicators are not sufficiently soluble in water in order to provide an adequate color upon dilution. Accordingly, in some cases it is desirable to first dissolve the indicator in a water miscible solvent. For example, when the indicator is phenolphthalein, the material is preferably first dissolved in isopropyl alcohol or pyridine and then added to the aqueous oil well treatment fluid. While not critical, the amount of indicator initially present in the treatment fluid is usually from about 0.001% to about 0.1%, based on the total weight of treatment fluid.

After the aqueous oil well treatment fluid has been prepared, containing a predetermined proportion of indicator, a measured amount of it is injected into the well. After a time sufficient to accomplish the desired treatment, return of the injected treatment fluid together with any accompanying formation liquids, such as brine, is begun. The degree of dilution of the original treatment fluid is then determined by the proportion of indicator present in the fluid returned. The proportion of indicator in the returned fluid is established by comparing its color with that of aliquots of standard dilution and containing known proportions of indicator. The aliquots of standard dilution are prepared by combining original treatment fluid with water in varying ratios to provide aliquots containing, for example, 10%, 20% etc. of original treatment fluid. The number of such aliquots used depends primarily on the accuracy desired in the determination of the degree of dilution and the ability of any given indicator to provide discernible differences in color with small variations in concentration. The color of the standard dilution aliquots may be developed, as required, by acid or base.

The proportion of indicator present in the returned fluid is the same as that present in the aliquot of known dilution to which the aliquot of returned fluid most nearly corresponds in color. As has been indicated prior to making this color comparison, it will sometimes be necessary to develop the color in the aliquot of the returned fluid. For example, when the indicator is phenolphthalein, a small quantity of sodium hydroxide can be added to the aliquot of the returned fluid. The relative intensity of the developed pink color is a measure of the degree of dilution of the original treatment solution. Thus being able to ascertain the degree of dilution, the amount of treatment fluid returned to the surface can be calculated, after the removal on any given volume of fluid from the well.

The present invention is subject to many modifications. Accordingly, it will be understood that the following example is presented solely for the purposes of illustration and should not be regarded as limiting in any way.

*Example 1*

An indicator solution was prepared by dissolving 0.2 lb. of phenolphthalein in one gallon of isopropyl alcohol. This indicator solution was then slowly added to a hydrochloric acid oil well treatment fluid with agitation. The amount of indicator solution added was 1 gallon per 1,000 gallons of the hydrochloric acid solution. Several small standard vials containing known amounts of the hydrochloric acid treatment solution were prepared. The contents of the vials were then diluted with water to a precisely measured extent to provide several standard dilution aliquots, one containing 25 percent by volume hydrochloric acid treatment, a second 50 percent, a third 75 percent, etc. The color in each of the standard dilution vials was developed by adding ½ of a full dropper of sodium hydroxide to each. The hydrochloric acid solution containing the indicator was then injected into a well. Thereafter, the diluted hydrochloric acid treatment solution which was returned to the surface was collected. An aliquot of this fluid was placed in a vial. Then, sodium hydroxide was added drop-wise until the pink color did not fade, and then ½ of a full dropper of sodium hydroxide was added to the vial to develop maximum color. The color intensity of this vial was then compared to the vials of standard dilution. The dilution of the original hydrochloric acid treatment solution in the developed aliquot was determined by observing which of the standard dilution aliquots was most nearly similar in color. Having determined the degree of dilution of the original hydrochloric acid treatment solution, it is a simple matter to determine the total amount of the original solution which has been returned to the surface.

In the foregoing example, pyridine can also be used as the water miscible solvent in lieu of isopropyl alcohol. In general, pyridine is more economical to use since it is a better solvent and will dissolve phenolphthalein to the extent of about 800 grams per 100 cc. A 50% aqueous pyridine mixture will dissolve about 300 grams of phenolphthalein per 100 cc. of the mixture. Fluorescein can also be used as the indicator. Like phenolphthalein, it will not absorb on the rock formation in the well and thus is not lost. Fluorescein has the advantage of not requiring development with a base, since it can be detected in very small quantities by ultraviolet light. The concentration of the fluorescein present in the diluted fluid can be determined by comparing the intensity of the color with the color of standard vials, in the manner already discussed above.

In addition to the indicators above-mentioned, other indicators for use in this invention appear in the compilation of acid-base, mixed, oxidation-reduction and fluorescent indicators set forth in Lange's Handbook of Chemistry; Tenth edition, pp. 955–960, inclusive. In any event, it will be understood that the indicators for use in our invention are neither readily absorbed by the well formation nor substantially dissolved by petroleum or produced solids.

Other suitable indicators for use in this invention include thymol blue cresolphthalein, cresol red and meta cresol purple.

Having fully described the invention, it is intended that it be limited only by the lawful scope of the appended claims.

We claim:

1. A method of determining the extent to which an aqueous oil well treatment fluid has returned to the surface, which comprises, first incorporating a predetermined proportion of a non-absorbed, oil-insoluble indicator into the aqueous oil well treatment fluid, injecting a known amount of the fluid into the well, removing the injected fluid together with any accompanying formation liquids from the well, and determining the proportion of indicator present in the fluid removed.

2. The method of claim 1 wherein the proportion of indicator present in the fluid removed is established by comparison with several standard dilution aliquots.

3. The method of determining the extent to which an aqueous oil well treatment fluid has returned to the surface which comprises first incorporating a predetermined proportion of phenolphthalein into the aqueous oil well treatment fluid, injecting a known amount of the fluid into the well, removing the injected fluid, together with any accompanying formation liquids from the well, and determining the proportion of phenolphthalein present in the fluid removed.

4. The method of determining the extent to which an aqueous oil well treatment fluid has returned to the surface which comprises first incorporating a predetermined proportion of fluorescein into the aqueous oil well fluid, injecting a known amount of the fluid into the well, removing the injected fluid together with any accompanying formation liquids from the well and determining the proportion of fluorescein present in the fluid removed.

5. A method of determining the extent to which an aqueous acid oil well treatment fluid has returned to the surface which comprises first incorporating a predetermined proportion of a non-absorbed, oil-insoluble indicator into the aqueous acid oil well treatment fluid, injecting a known amount of the fluid into the well, removing the injected fluid together with any accompanying formation liquids from the well and determining the proportion of indicator present in the fluid removed.

6. A method of determining the extent to which an aqueous acid oil well treatment fluid has returned to the surface which comprises first incorporating a predetermined proportion of phenolphthalein into the aqueous acid oil well treatment fluid, injecting a known amount of fluid into the well, removing the injected fluid together with any accompanying formation liquids from the well and determining the proportion of phenolphthalein present in the fluid removed.

7. A method of determining the extent to which an aqueous acid oil well treatment fluid has returned to the surface which comprises incorporating a predetermined proportion of fluorescein into the aqueous acid oil well treatment fluid, injecting a known amount of the fluid into the well, removing the injected fluid together with any accompanying formation fluids from the well and determining the proportion of fluorescein present in the fluid removed.

8. A method of determining the extent to which an aqueous oil well treatment fluid has returned to the surface which comprises first incorporating a predetermined proportion of phenolphthalein into the aqueous oil well treatment fluid, injecting a known amount of the fluid into the well, removing the injected fluid together with any accompanying formation liquids from the well, determining the proportion of phenolphthalein present in the fluid removed with a base and comparing the color with the color of solutions of known dilution.

9. A method of determining the extent to which an aqueous oil well treatment fluid has been returned to the surface which comprises first incorporating a predetermined proportion of fluorescein into the aqueous oil well treatment fluid, injecting a known amount of the fluid into the well and removing the injected fluid together with any accompanying formation liquids from the well and determining the proportion of fluorescein present by comparing the color of a portion of the fluid removed with the color of solutions of known dilution.

References Cited

UNITED STATES PATENTS

| 2,553,900 | 5/1951 | Doan et al. | 166—4 X |
| 2,868,625 | 1/1959 | Frank | 166—4 X |
| 3,003,856 | 10/1961 | Boyd | 166—4 X |
| 3,173,293 | 3/1965 | Eckels | 166—4 X |
| 3,180,142 | 4/1965 | Bombardieri | 166—4 X |

OTHER REFERENCES

Hassebroek, Williard E., et al. Hydraulic Fracturing, Reprinted from Petroleum Engineer, July 1961, pp. 4 and 5 (copy in 166-42).

Hodgman, Charles D., Handbook of Chemistry and Physics, Cleveland, Ohio, Chemical Rubber Pub. Co. 36th Ed., 1954, pp. 1612–1615 Q.D. 65C.4.

CHARLES E. O'CONNELL, *Primary Examiner.*

IAN A. CALVERT, *Assistant Examiner.*